United States Patent
Li (10) Patent No.: US 8,825,586 B2
(45) Date of Patent: Sep. 2, 2014

(54) VEHICLE TYPE RECOGNITION AT A CHECKPOINT USING PCA AND BIC

(75) Inventor: Zhengrong Li, Saskatoon (CA)

(73) Assignee: International Road Dynamics, Saskatoon, Saskatchewan (CA)

( * ) Notice: Subject to any disclaimer, the term of this patent is extended or adjusted under 35 U.S.C. 154(b) by 1054 days.

(21) Appl. No.: 12/711,535

(22) Filed: Feb. 24, 2010

(65) Prior Publication Data

US 2010/0274754 A1    Oct. 28, 2010

Related U.S. Application Data

(60) Provisional application No. 61/154,886, filed on Feb. 24, 2009.

(51) Int. Cl.
  *G06F 15/18* (2006.01)
  *G06N 3/04* (2006.01)
  *G01G 19/02* (2006.01)

(52) U.S. Cl.
  USPC ............. 706/52; 706/17; 706/20; 702/173; 702/174

(58) Field of Classification Search
  USPC .......................................................... 706/52
  See application file for complete search history.

(56) References Cited

PUBLICATIONS

Donaiah, Truck Identification Using New Jersey Weigh in Motion Data [online], May 2008 [retrieved on Sep. 3, 2013]. Retrieved from the Internet<URL:http://bluecoat-06/?cfru=aH R0cDovL3J1Y29 yZS5saWJyYXJpZXMucnV0Z2Vycy5IZHUvcnV0Z2Vycy1sa WlyMjQzNzQvUERGLzEv>.*

* cited by examiner

*Primary Examiner* — Jeffrey A Gaffin
*Assistant Examiner* — Nathan Brown, Jr.
(74) *Attorney, Agent, or Firm* — Nixon & Vanderhye P.C.

(57) ABSTRACT

A method is provided herein for determining and recognizing types of vehicles passing a check point. The method takes advantage of an EM algorithm which is up-loaded into a CPU and which processes data of the vehicles which drive past a checkpoint, the data being representative of essential characteristics of vehicles to produce an output model of the traffic volumes of the various types of vehicles. This model enables the forecasting of future road maintenance costs and the planning and designing of future road networks.

9 Claims, 7 Drawing Sheets

VEHICLE TYPE RECOGNITION AT A CHECKPOINT USING PCA AND BIC

This invention relates to a system and method for cluster analysis for vehicle identification and claims priority of application 61/154,866, filed Feb. 24, 2009, the entire content of which are incorporated herein by reference It is very useful to build an automatic computer system to recognize the types of vehicles passing a checkpoint given some easy-to-get data about the vehicles, such as the distances between axles, the weights on each axle. Such a system has many applications, for example, in monitoring traffic volumes and identifies the type of vehicle, which will be helpful in budgeting road maintenance costs.

The simplest clustering technique is the K-means clustering. However, K-means clustering requires that the users supply with a number of clusters. X-means clustering may be an alternative method since it can detect the number of clusters with some simple criteria, but X-means would introduce more severe local mode problem.

BACKGROUND INFORMATION

The partitioning of large data sets into similar subsets (Cluster Analysis) is an important statistical technique used in many fields (data mining, machine learning, bioinformatics, and pattern recognition and image analysis). In traffic research, it is useful both to determine and to recognize the types of vehicles passing a checkpoint. Traffic data collection systems would collect data (e.g., vehicle length, distances between axles, weights on. axles) and such data may be used to determine and recognize vehicle types in high volume traffic, monitoring traffic volumes of various types of vehicles forecasting future road maintenance costs and planning and design of future road networks.

The consequence of such determination and recognition of vehicle types in high volume traffic has many applications, e g, monitoring traffic volumes of various types of vehicles, forecasting future road maintenance costs and planning and design of future road networks.

DESCRIPTION OF THE INVENTION

Aims of the Invention

A main aim of the present invention is to develop a better methodology for cluster analysis with application to the problem of vehicle detection and determination of its type as noted above.

Another aim of the present invention is to provide a new method to overcome potential problems by merging similar clusters after running X-means clustering.

Another aim of the invention is to provide better methodology for cluster analysis with application to the vehicle detection problem.

Statement of Invention

One aspect of the present invention provides a method of determining and recognizing the types of vehicles passing a checkpoint by collecting vehicle data (e.g., vehicle length, distances between axles, weights on axles) and using that data to determine and recognize vehicle types, particularly in high volume traffic for monitoring traffic volumes of various types of vehicles, forecasting future road maintenance costs and planning and design of future road networks, the method comprising: uploading a computer program into a CPU, the computer program comprising an EM algorithm as particularly described in the specification herein, the algorithm including data representations of essential characteristics vehicles as they drive past the checkpoint; entering such measured characteristics vehicles as they travel past the checkpoint into that CPU; and deriving an output from that CPU, and thereby determining and recognizing the types of vehicles passing the checkpoint, particularly in high volume traffic, for monitoring traffic volumes of various types of vehicles, forecasting future road maintenance costs and planning and design of future road networks.

Another aspect of the present invention provides an apparatus comprising the combination of: a CPU: and a computer program which has been uploaded into said CPU, the computer program comprising an EM algorithm as particularly described in the specification herein, the algorithm including data representations of essential characteristics of vehicles.

It has been found according to aspects of the present invention, that there arc correlations between different variables. This invention proposes to avoid the problem which arises by using the Euclidean distance, since data may be assigned to the wrong centroids. The present invention seeks to overcome this problem by replacing the Euclidean distance with the Mahalanobis distance.

The following description provides examples of methods of aspects of the present invention.

BRIEF DESCRIPTION OF THE DRAWINGS

In the accompanying drawings.

Figure 1:
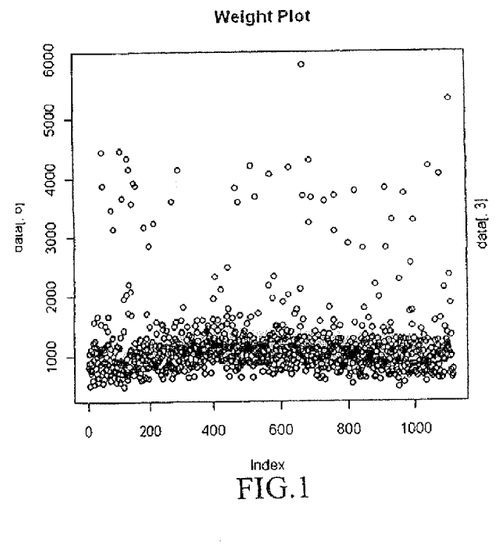
FIG. 1 is a graph showing some data points derived from traffic data collection systems which have collected data (e.g., vehicle length, distances between axles, weights on axles, etc.), which data may be used to determine and recognize vehicle types in high volume traffic, but in which the cluster points are incorrectly clustered
Figure 2:
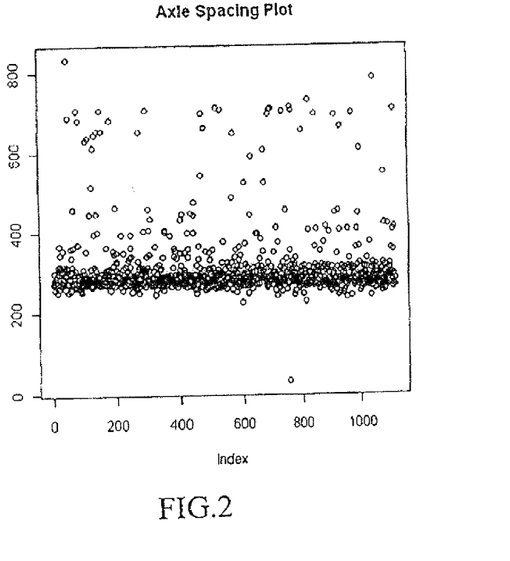
FIG. 2 is a graph showing some data points derived from traffic data collection systems which have collected data (e.g., vehicle length, distances between axles, weights on axles, etc.), which data may be used to determine and recognize vehicle types in high volume traffic, but in which the cluster points are correctly clustered
Figure 3:
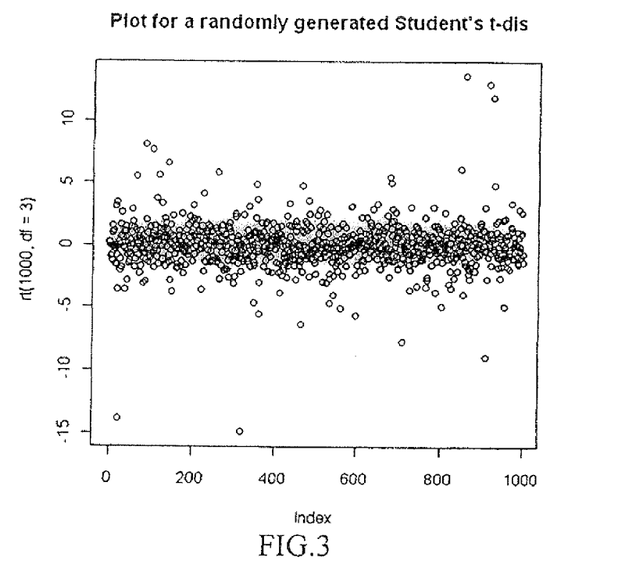
FIG. 3 is a graph showing some data points derived from traffic data collection systems which have collected data (e.g., vehicle length, distances between axles, weights on axles, etc.), which data may be used to determine and recognize vehicle types in high volume traffic, where the X-means is used to cluster these points, using Euclidean distances, which is not correct.

One explanation of the results plotted in FIGS. 1, 2 and 3 is because the X-means algorithm does not permit returning back to re-cluster the data, since it runs a local K-means for each pair of "children". The K means is local in that the "children" are fighting each other for the points in the "parent's" region and in no others. All the points from the other regions are ignored.

This problem of local mode can be overcome, according to broad aspects of the present invention, by merging two regions which are close to each other after the X-means algorithm is run. If the model after merging has a higher BIC score than the model before merging, these regions will be merged. Otherwise, the original model is kept.

Figure 4:
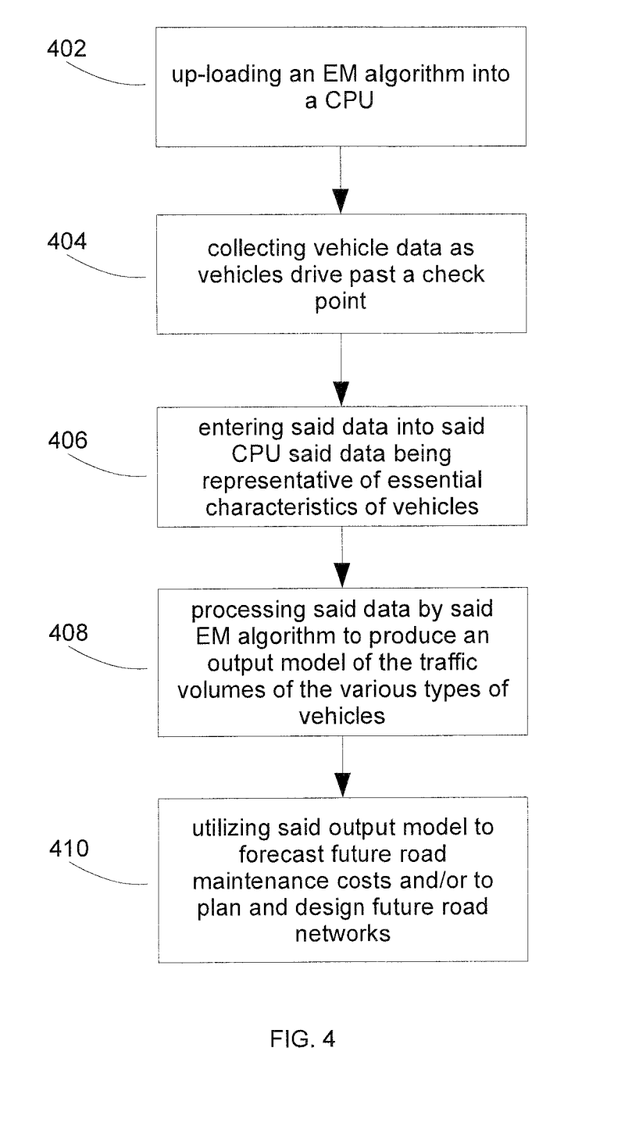
FIG. 4 is a flow chart of an embodiment of a method for determining and recognizing types of vehicles passing a check point.

Referring now to FIG. 4, at step 402, the EM algorithm is uploaded into a CPU. Then, at step 404, data about a vehicle is collected as the vehicle drives past a check point. The vehicle data consists of representations of essential characteristics of the vehicle. Next, at step 406, the vehicle data is entered into the CPU. In step 408, the EM algorithm processes the vehicle data to produce an output model of the traffic volumes of the various types of vehicles passing by the check point. At step 410, the output model is utilized to forecast future road maintenance costs and/or to plan and design future road networks.

Figure 5:
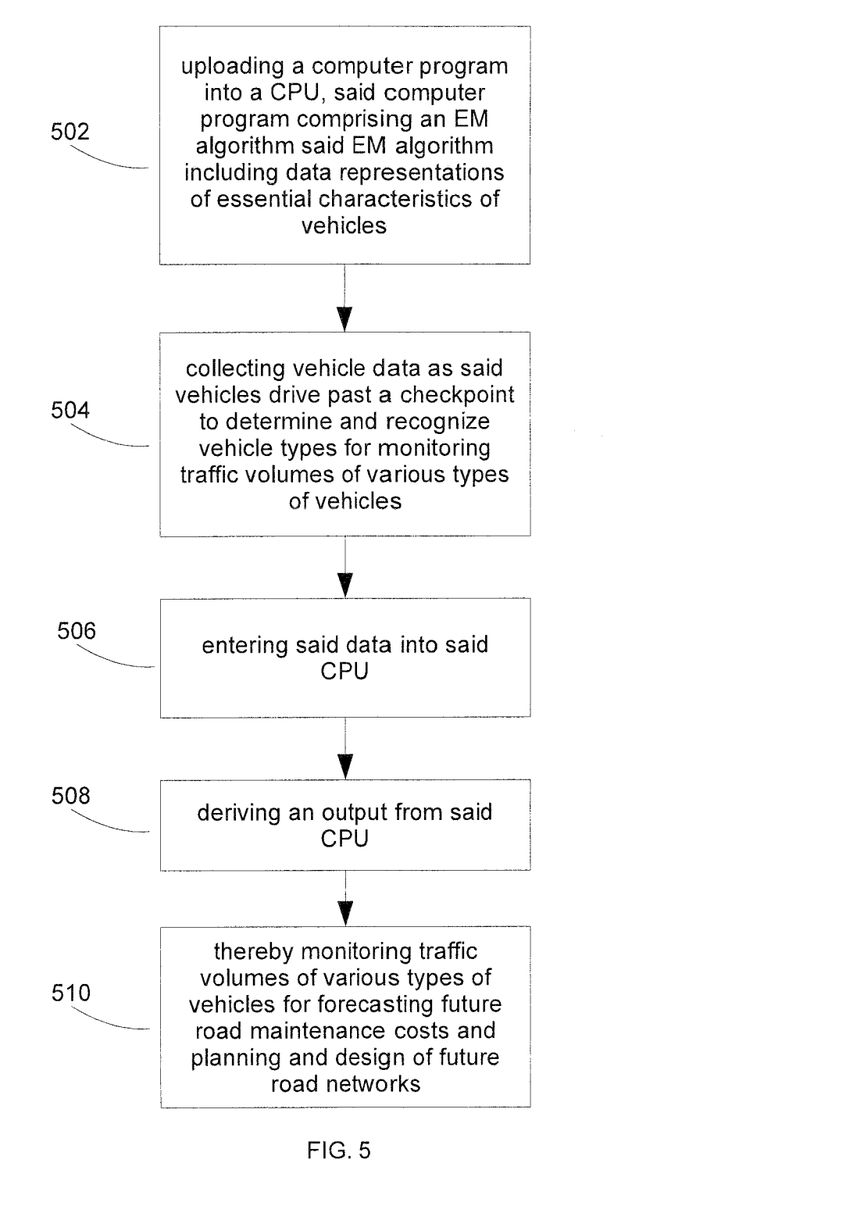
FIG. 5 is a flow chart of another embodiment of a method for determining and recognizing types of vehicles passing a check point.
Figure 8A:
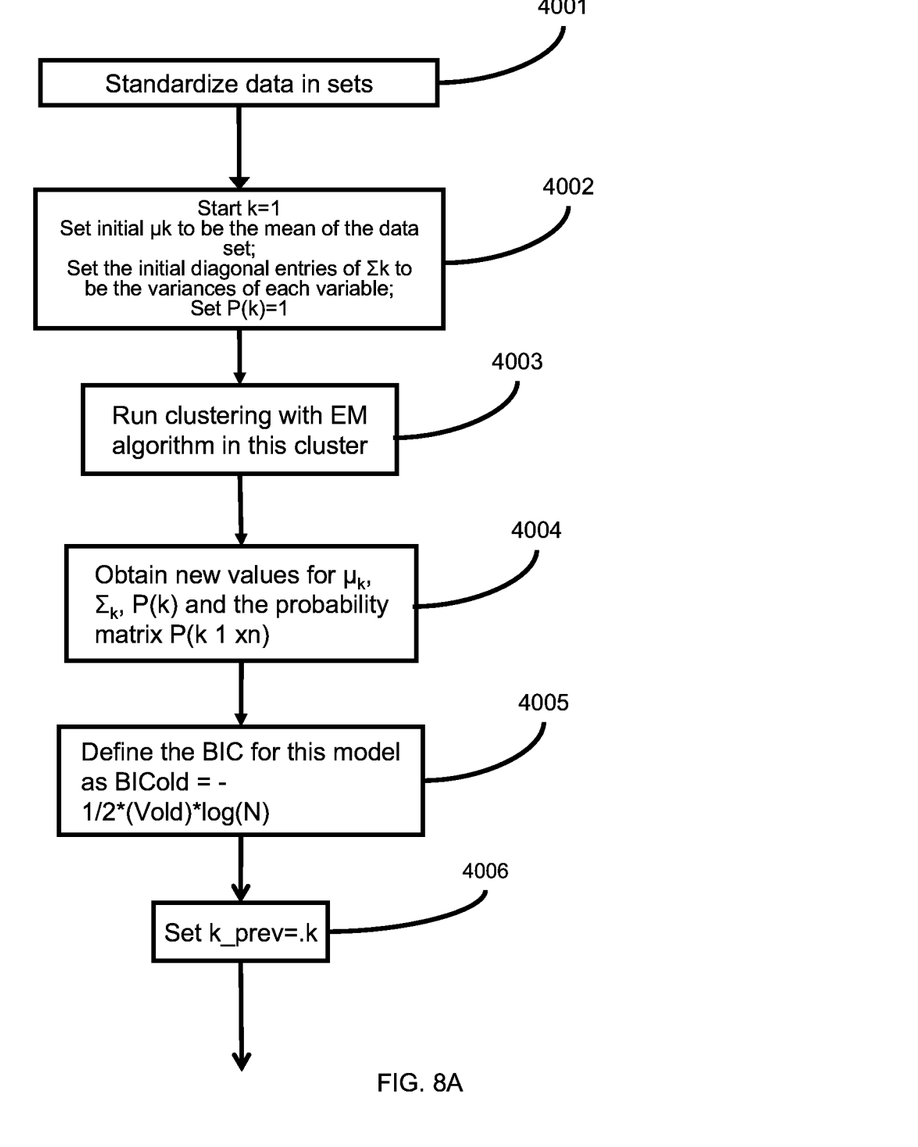
FIGS. 8A and 8B are flow charts of an example embodiment EM algorithm for determining and recognizing types of vehicles passing a check point.
Figure 8B:
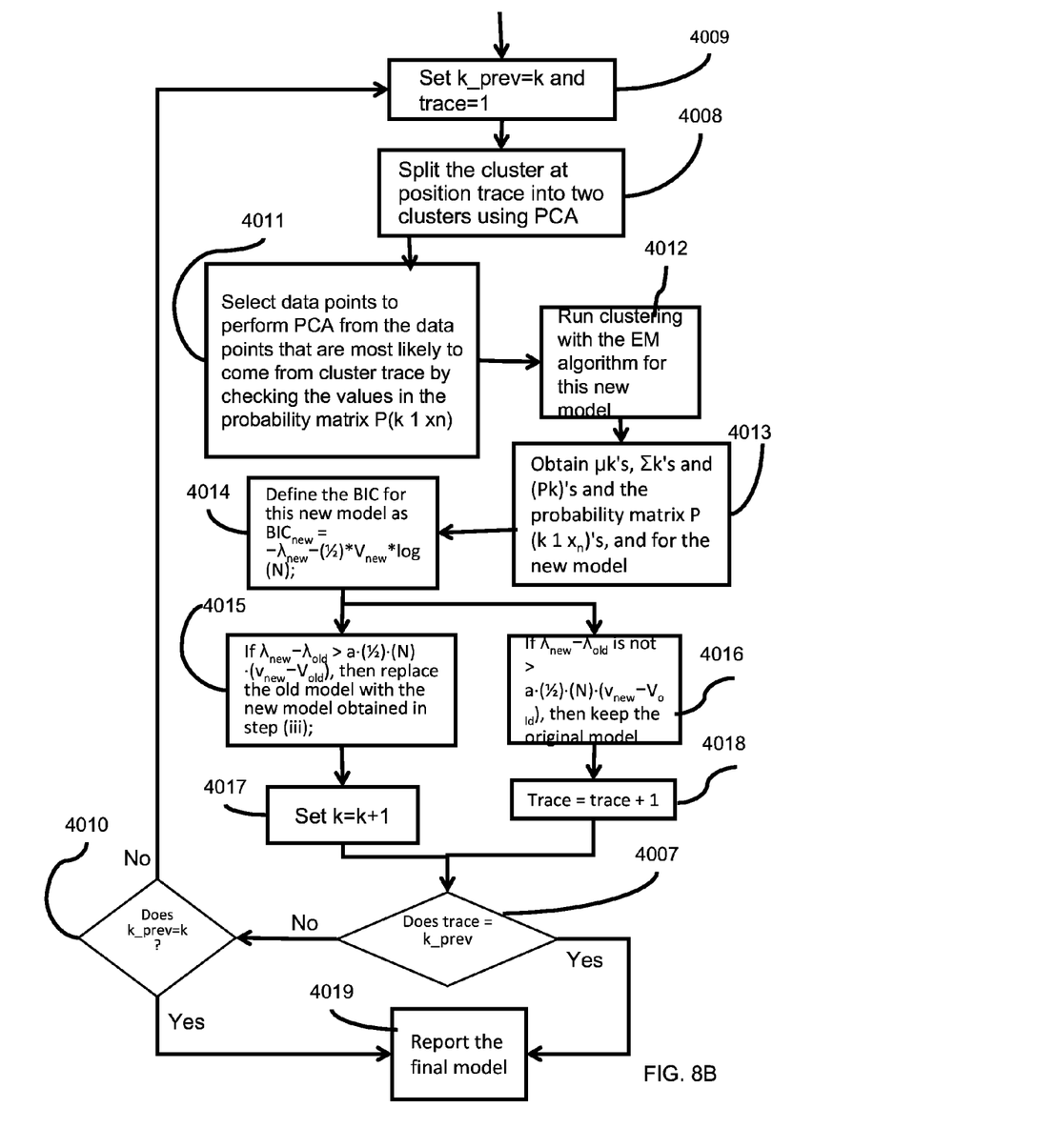

Referring now to FIGS. 8A and 8B, an example embodiment EM algorithm for determining and recognizing types of vehicles passing a checkpoint is provided. In this example embodiment, the EM algorithm provided in FIGS. 8A and 8B is up-loaded to the CPU as shown in 402. This example EM algorithm is then used to process the data as shown in 408. The EM algorithm is described in the method steps provided below Referring now to FIG. 5, at step 502, a computer program is uploaded into a CPU, the computer program comprises an EM algorithm, and the EM algorithm includes data representations of essential characteristics of vehicles. Then, at step 504, vehicle data is collected as the vehicles drive past a check point to determine and recognize vehicle types for monitoring traffic volumes of various types of vehicles. Next, at step 506, the collected vehicle data is entered into the CPU. Then, at step 508, an output is derived the CPU. At step 510, thereby traffic volumes of various types of vehicles are monitored for forecasting future road maintenance costs and planning and design of future road works.

Figure 6:
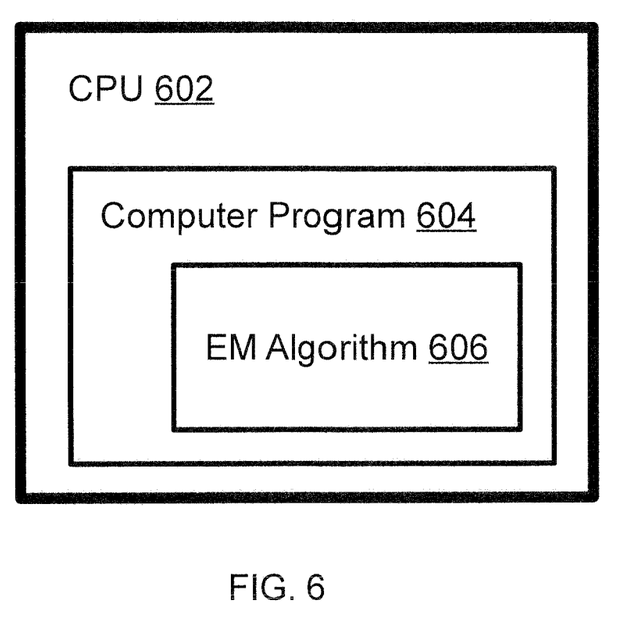
FIG. 6 is a schematic diagram of an embodiment of an apparatus for cluster and discriminant analysis for vehicle detection.

Referring now to FIG. 6, there is shown an embodiment of an apparatus comprising the combination of a CPU 602 and, a computer program 604 which has been uploaded into said CPU 602, the computer program 604 comprising an EM algorithm 606, the EM algorithm 606 including data representations of essential characteristics of vehicles (not shown).

Figure 7:
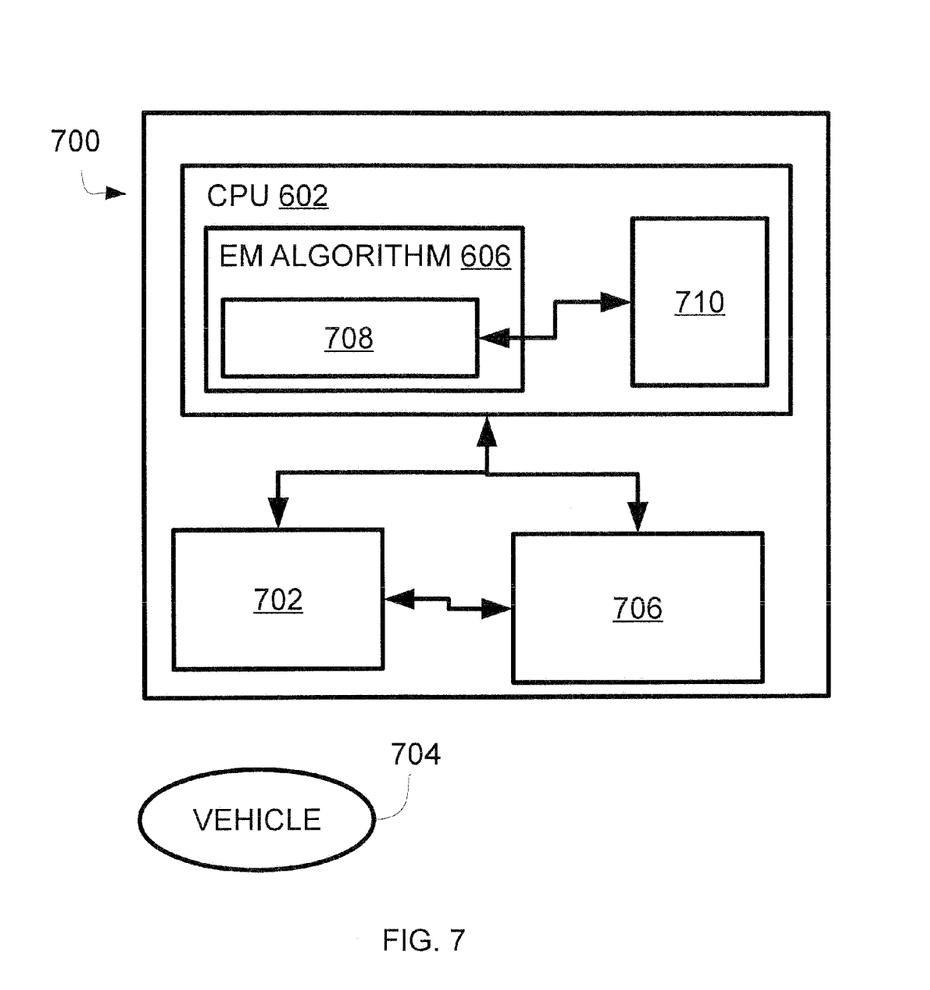
FIG. 7 is a schematic diagram of an apparatus for determining and recognizing types of vehicles passing a check point.

Referring now to FIG. 7, there is shown an embodiment of an apparatus for determining and recognizing types of vehicles passing a check point 700 that comprises, a CPU 602, an EM algorithm 606 uploaded into the CPU 602, structure 702 operatively associated with said CPU 602 for collecting vehicle data as vehicles drive past said check point 700. A vehicle is shown as 704, and it is moving past the check point 700, specifically the structure 702. The check point 700 also comprises means 706, operatively associated with said CPU 602, for entering said data into said CPU 602 said data being representative of essential characteristics of vehicles, and, means 708 for processing said data by said EM algorithm 606 to produce an output model (not shown) of the traffic volumes of the various types of vehicles, and, means 710 for utilizing said output model (not shown) to forecast future road maintenance costs and/or to plan and design future road networks. FIG. 7 is representative and not to scale.

Assumptions

In the method of determining and recognizing the types of vehicles passing a checkpoint by collecting vehicle data (e.g., vehicle length, distances between axles, weights on axles) according to aspects of the present invention, by plotting graphs for all the variables (axle spacing, weights, front bumping spacing, and rear bumper spacing) in the data set, each variable forms a pattern which is similar to a "Student's" t-distribution. Therefore, it will be assumed that each variable in the data set comes from a "Student's" t-distribution. Since all the variables for a given data point must be considered, it will be assumed that each data point forms a multivariate "Student" distribution. In statistics, a "multivariate Student distribution" is a multivariate generalization of the Students t-distribution.

The present invention will be further described by reference to method steps to be carried out Finding Parameter Values with EM Algorithm Method Steps The setup for the method steps is that given "N" data points in a V-dimensional space, it is desired to find a set of "K" "multivariate Student's t-distribution" that best represents the distribution of all the data points. Without being bound by theory, it is believed that the given data set is an N*V matrix where N stands for the number of data points and V stands for the number of variables for each data point.

DEFINITION OF TERMS

N=number of data points.
V=number of variables.
K=number of dusters.
$\mu_k$=the mean for kill cluster, each a vector of length V.
$\Sigma_k$:=the covariance matrices for $k^{th}$ duster, each of size V*V.
$x_n$:=the $n^{th}$ data point, which is a vector with length V.
P(k ! $x_n$:)=the probability that $x_n$ comes from cluster k.
p(k)=: the probability that a data point chosen randomly comes from cluster k.
P($x_n$)=the probability of finding a data point at position $x_n$
$\lambda$=the value of log likelihood of the estimated parameter set.

For simplicity, it is assumed that $\Sigma_k$ is a diagonal matrix, i.e., a matrix whose non diagonal entries are all 0, and where the diagonal entries are the variances for each variable.

Three statistical methods are used for the method steps, which are carried out to find parameter values with the EM algorithm, splitting clusters using Principle Component Analysis (PCA), and comparing models by Bayesian Information Criterion (BIC).

$\lambda$ is the key to this method. While it is not desired to be limited by any particular theory, it is believed that it is necessary to find the best values for the parameters by maximizing the value of $\lambda$. This method maximizes the posterior probability of the parameters if the specific priors are given.

The steps are described as follows

Step 1

Set the starting values for the $\mu_k$'s, $\Sigma_k$ s, P (k). The method to obtain these values is by means of splitting clusters using PCA as follows:

The setup for this method is that, given some data points in one cluster (mother cluster), it is necessary to split these data points into two clusters (children clusters), using PCA. PCA is mathematically defined as "an orthogonal linear transformation that transforms the data to a new coordinate system such that the greatest variance by any projection of the data comes to lie on the first coordinate (called the first principal component), the second greatest variance on the second coordinate", and so on. The data set comprises an N*matrix. PCA is now performed on this data matrix. The standard deviations are now calculated of the principal components, namely, the square roots of the eigenvalues of the covariance matrix. The matrix is now calculated for variable loadings, namely, a matrix whose columns contain the eigenvectors. In R, there is a built-in function called "prcomp" which helps the calculations.

The terms used are defined as follows:

std=a vector contains the square roots of the eigenvalues of the covariance matrix.

Rotation=a matrix whose columns contain the eigenvectors

Range: how far the data is to be split; the value of range is usually between 1.5 and μ=the mean for the mother cluster, each a vector of length V Σ=the covariance matrix for the mother cluster, each of size*

P(m)=the probability that a data point chosen randomly comes from the mother cluster Since the first principal component is the most important component, two vectors are created with length V from the first principal component. Two vectors are created since it is desired to split the data into two clusters. The first element in the first vector is the value of +range (plus range), and the other elements are all zero. The first element in the second vector is the value of −range (minus range), and the other elements are all zero. The first vector is $V_1$, and the second vector is $V_2$. Consider $V_1$, $V_2$, and std to be matrices with one column. After the splitting is done, two means are provided for two children clusters. The mean for the first children cluster is $\mu_1$ and the mean for the second children cluster $\mu_2$. The calculation for $\mu_1$ and is as follows:

$$\mu_1 = \mu + \text{rotation} \%*\% (V_1 * std)$$

$$\mu_2 = \mu + \text{rotation} \%*\% (V_2 * std)$$

Here, k*k and "%*%" different operations.

For example, $$\begin{matrix} a & d \\ b*e & = b*e \\ c & f \end{matrix} \quad \begin{matrix} a+d \\ \\ c*f \end{matrix} \quad \text{but} \quad \begin{matrix} a & d & g \\ b & e & h \\ c & f & i \end{matrix} \%*\% \begin{matrix} j \\ k \\ l \end{matrix} = \begin{matrix} a*j & +d*h+g*1 \\ b*j & +e*k+h*1 \\ c+j & +f*k+l+l \end{matrix}$$

The covariance matrices for two children clusters would be the same as the mother cluster, and the probability that a data point chosen randomly comes from the children clusters would be half of P{m}.

In summary, for the first children cluster, mean=μ1, covariance matrix=Σ, and probability that a data point chosen randomly comes from this cluster=(½)*P{m}; for the second children cluster, mean $\mu_2$, covariance matrix=Σ, and probability that a data point chosen randomly comes from this cluster=(½)*P{m}.

There is one limitation about PCA. If PCA is performed on a given data matrix, PCA requires the number of data points to be larger than the number of variables. If the number of data points is smaller than the number of variables, PCA will do nothing on the data matrix, and splitting will not happen Step 2:

Given the values for the $\mu_k$'s, $\Sigma_k$ s, P (k), and the data, of P ($x_n$ $1\mu_k$, $\Sigma_k$) can be calculated. we assume all the variables in the data set form a multivariate Student's distribution, P ($x_n$ $1\mu_k$, $\Sigma_k$ is the multivariate Student's density, that is, $$P(x_n \mid \mu_k, \sum_k) = \frac{r\left[\frac{(df+p)}{2}\right]}{r\left(\frac{df}{2}\right) * \pi^{\frac{p}{2}} * (df)^{\frac{p}{2}} * (\det \Sigma)^{\frac{1}{2}} *} \\ \left[1 + \left(\frac{1}{df}\right) * (x_n - \mu_k)^T * \Sigma^{-1} * (x_n - \mu_k)\right]^{\left(\frac{df+p}{2}\right)}$$

where df=the degree of freedom, p=the number of variables, and detΣ=the determinant for Σ

One important thing about P ($x_n$ $1\mu_k$, $\Sigma_k$) is that the values of P ($x_n$ $1\mu_k$, $\Sigma_k$) often be very small as to underflow to zero. Therefore, it is necessary to work with the logarithm of P($x_n$ $1\mu_k$, $\Sigma_k$) that is $$\log P(x_n \mid \mu_k, \sum_k) = \log r\left(\frac{df+p}{2}\right) - \log r\left(\frac{df}{2}\right) - \log(\pi)^{\frac{p}{2}} - \log(df)^{\frac{p}{2}} - \\ \log(\det \sum)^{\frac{1}{2}} - \log\left[1 + \left(\frac{1}{df}\right) * (x_n - \mu_k)^T * \sum^{-1} * (x_n - \mu_k)\right]^{\left(\frac{df+p}{2}\right)}$$

After the value of P ($x_n$ $1\mu_k$, $\Sigma_k$) is obtained, it becomes possible to calculate the value of P ($x_n$) splitting P ($x_n$) into its contribution from each of the K multivariate Student's t-distributions, that is, $$P(X_n) = \sum_k P(x_n \mid \mu_{k,k}) P(k)$$

One problem may rise for P ($x_n$), where it becomes necessary to calculate the sum of quantities. Some of these quantities may be so small that they underflow to zero. According to an aspect of the present invention, it has been found that one possible way to fix this problem is construct the quantities from their logarithms. That is, store P ($x_n$ $1\mu_k$, $\Sigma_k$) P(i) in log P($x_n$ $1\mu_k$, $E_k$), and let $m_{log}$=max log(P ($x_n$ $1\mu_k$, $\Sigma_k$)P(i)0 ... log P(k))). Then the logarithm of the sum is computed as follows:

$$\log P(x_n) = \log(m_{log}) + \log\left(\sum_i \exp(\log(P(x_n \mid \mu_i, \sum i) P(i)) - m_{log})\right)$$

Using the values of P ($x_n$ $1\mu_k$, $\Sigma_k$) and P ($x_n$), the value of P(k|$x_n$} and λ:

$$P(k \mid x_n) = \frac{P(x_n, \mu_k, \sum_k) P(k)}{P(x_n)}$$

$$\lambda = \log(\prod_n P(x_n)) = \sum_n \log P(x_n)$$

Since the values of log P ($x_n$ $1\mu_k$, $\Sigma_k$) and P ($x_n$) can be computed in order to overcome the problem of underflow, it is possible to write P{k 1 $x_n$) in terms of log P ($x_n$ $1\mu_k$, $\Sigma_k$) and log P ($x_n$), $$P(k|x_n) = \exp(\log P(x_n|\mu_k, \Sigma_k)) + \log P(k) - \log P(x_n))$$

By calculating P (k 1 $x_n$) for all values of k's and $x_n$'s, it is now possible to obtain all of the values P (k|$x_n$}'s. and it now becomes possible to write P (k|$x_n$}'s as a probability matrix of size N*K. Each row=one data point, and each column=one cluster. Each element in the matrix=the value of P (k|x$_n$) that is, the probability that a given data point comes from a specific cluster k. In the language of the EM algorithm, this is called, an expectation step or an E-step.

Step 3:

Using P (k|x$_n$)'s from step 2, the values of maximum likelihood estimates for $\mu_k$'s, $\Sigma_k$'s and P(k}'s and for all values of k, can be calculated, that is, the values of $\mu_k$'s, $\Sigma_k$'s and P(k}'s that maximize the log likelihood function λ. The maximum likelihood estimate for P(k) is easy to obtain:

$$P(k) = \frac{1}{N} \sum_n P(k \mid x_n).$$

The process to calculate the maximum likelihood estimates for $\mu_k$'s, $\Sigma_k$'s is very complex. For a given cluster k (k=1, 2, 2 . . . K,), the log likelihood function needed to maximize is as follows:

$$\lambda = \sum_n \log(P(x_n \mid \mu_k, \sum_k)) * P(k \mid x_n).$$

It is now necessary to find the values of $\mu_k$ and $\Sigma_k$'s for K=1, 2, 3 . . . K that maximize the above function.

Most of the programming languages have the build-in functions to calculate the values of the parameters that maximize a given function. For example, in R, we can use a build-in function called "nlm" can be used to calculate the maximum likelihood estimates for ~k'S 'S. the language of the EM steps is called a maximization step or M-step.

Step 4:

Using the maximum likelihood estimates for $\mu_k$'s, $\Sigma_k$'s and (Pk}'s as the new $\mu_k$'s, $\Sigma_k$'s and (Pk}'s, repeat Step 2 and Step 3 until the value of λ no longer changes.

After the clustering process, the final values for $\mu_k$'s, $\Sigma_k$'s and (Pk}'s have been obtained for all values of k. A probability matrix whose entries are the final values of P (k|x$_n$)'s have also been obtained Given a data point, the corresponding row in the probability matrix for this data point can be found Then, it is possible to determine which cluster most likely comes from by looking at the values of P (k 1$_{xn}$)'s from this row. The column index which produces the largest value of P (k 1 x$_n$) is the cluster where it belongs.

Comparing Models by Bayesian Information Criterion (BIC)

Suppose the parameters have been estimated for models with different number of components, the "best' model is selected according to the Bayesian Information Criterion (BIC). The BIC score is defined as λ−(½)*v*log{n}, where λ is the value of log likelihood function using the estimated parameters, v is the number of independent parameters of the model, and n is the number of observation. The selected model is that with the highest BIC score.

For example, if there are two BIC s corresponding to a new model and an old model, they are named BIC$_{new}$ and BIC$_{old}$. BIC$_{new}$=λ$_{new}$(½)*V$_{new}$*log {N}, and BIC$_{old}$=λ(½)*V$_{old}$*log {N}. The new model is accepted if BIC$_{new}$>BIC$_{old}$, That is, λ$_{new}$−(½)*V$_{new}$*log {N}>λ$_{old}$−(½)*V$_{old}$*log {N}, which is the same as λ$_{new}$−λ$_{old}$>(½)*log {N}*(v$_{new}$−V$_{old}$)

Since BIC is an approximation, it is not 100% accurate. A variable is added to control the BIC. A variable, a, is therefore introduced, such that the Model is selected if λ$_{new}$−λ$_{old}$>* (½)*log {N}*(λ$_{new}$−V$_{old}$). In theory, the value of a is 1, but by changing the value of a, the model selected can be controlled For example, if a is set to be relatively small, then there is a high probability that the new model will be selected. If a is set to be relatively large, then there is a high probability that the old model will be selected.

Standardize the Data Set

One problem with the data set is that each variable may have different shape in terms of the student t-distribution. Therefore, each variable must be standardized order to let it follow a standard student t-distribution. The steps for such standardization are as follows:

Consider all data points coming from one cluster. Set initial value of Σ to be the mean of the data points, and set the initial diagonal entries of Σ to be the variances of each variable.

Find the maximum likelihood estimates for $\mu_m$ and $\Sigma_m$, Create a vector with the diagonal entries of $\Sigma_m$ and call it var$_m$ For a given data point x$_n$, standardize it by using (x$_n$−$\mu_m$)/$\sqrt{var_m}$ Method Steps Using these statistical methods explained above, the method steps according to aspects of the present invention is now constructed. If the vehicles have a different number of clusters, the can not be in the same cluster. Hence, then data set can be classified into groups according to the number of the axles. Each group can therefore be partitioned into small groups by grouping vehicles with the same axle pattern{s, d, t, or q) together. Then the method steps are run inside each small group 1) Standardize said data in sets as shown in FIG. 8A 4001;
2) When said data is standardized in sets, start with k=1 as shown in FIG. 8A 4002;
3) Set the initial value of $\mu_k$ to be the mean of the data set as shown in FIG. 8A 4002.
4) Set the initial diagonal entries of Σk to be the variances of each variable as shown in FIG. 8A 4002.
5) Set P(K)=1 as shown in FIG. 8A 4002.
6) Run clustering with the EM algorithm in this cluster as shown in FIG. 8A 4003.
7) Obtain the new values for $\mu_k$, $\Sigma_k$ P(k) and the probability matrix P(k 1 x$_n$) as shown in FIG. 8A 4004.
8) Define the BIC for this model as BIC$_{old}$id=−(½)*(V$_{old}$)*log(N) as shown in FIG. 8A 4005.
9) Set k_prev=.k as shown in FIG. 8A 4006, and
10) Repeat the following steps until k_prev=k as shown in FIG. 8B 4010
   a) Set k_prev=k and a new variable called trace=1 as shown in FIG. 8B 4009
   b) Repeat the following steps until trace-=k_prev as shown in FIG. 8B 4007
      (i) split the cluster at position trace into two clusters using PCA as shown in FIG. 8B 4008
      (ii) Select data points to perform PCA from the data points that are most likely come from cluster trace by checking the values in the probability matrix P (k 1 x$_n$) as shown in FIG. 8B 4011.
      (iii) Run clustering with the EM algorithm for this new model as shown in FIG. 8B 4012,
      (iv) Obtain $\mu_k$'s, $\Sigma_k$'s and P(k)'s and the probability matrix P(k 1 x$_n$)'s and for the new model as shown in FIG. 8B 4013.
      (v) Define the BIC for this new model as BIC$_{new}$=−λ$_{new}$−(½)*V$_{new}$*log(N) as shown in FIG. 8B 4014
      (vi) If λ$_{new}$−λ$_{old}$>a·(½)·(N)·(v$_{new}$−V$_{old}$), then replace the old model with the new model obtained in step (iii) as shown in FIG. 4B 4015;

(vii) set k=+1 as shown in FIG. 8B 4017
(viii) If $\lambda_{new}-\lambda_{old}$ is not >a·(½)·(N)·($v_{new}-V_{old}$), then keep the original model as shown in FIG. 8B 4016
(ix) trace=trace+1 as shown in FIG. 8B 4018
11) Finally report the final model as shown in FIG. 8B 4019;
thereby determining and recognizing the types of vehicles passing the checkpoint to determine and recognize vehicle types in high volume traffic for monitoring traffic volumes of various types of vehicles, forecasting future road maintenance costs and planning and design of future road networks,
wherein, in said steps,
N=number of data points;
V=number of variables;
K=number of clusters.
$\mu_k$=the mean for kill cluster, each a vector of length V.
f° k:=the covariance matrices for kth duster, each of size V*V.
xn.=the nth data point, which is a vector with length V.
P(k !xn:)=the probability that xn comes from cluster k.
p(k)=the probability that a data point chosen randomly comes from cluster k.
P(xn)=the probability of finding a data point at position xn
$\lambda$=the value of log likelihood of the estimated parameter set.
PCA=Principal Component Analysis
BIC=Bayesian Information Criterion
The clustering result is obtained by checking the values in the final probability matrix.

Using the final model, any data points may be clustered. For example, if some data points are given, they can be assigned to their corresponding clusters. Using Step 2 to 8 as defined above with the EM algorithm method step a probability matrix can be obtained whose entries are the values of P (k 1 $x_n$) for all values of cluster k's and $x_n$'s. From these values it is possible to determine which cluster that each data point most likely comes from by checking the values in the probability matrix.

If there is a vehicle that seldom appears, and it is desired to cluster it into a single cluster once it appears, this can be accomplished by adding a new cluster to the final model. The value of μ for the new cluster is the same as the variable values for this vehicle. The covariance matrix Σ is a diagonal matrix. The diagonal entries of Σ is set to be very small numbers, namely the variances for each variable are small numbers. The values of P(k) for this cluster are set to be a small number since this vehicle is very rare to appear.

The invention claimed is:

1. A method for determining and recognizing types of vehicles passing a check point, which comprises:
up-loading an EM algorithm into a CPU;
collecting vehicle data as vehicles drive past a check point;
entering said data into said CPU said data being representative of essential characteristics of vehicles;
processing said data by said EM algorithm to produce an output model of the traffic volumes of the various types of vehicles; and
utilizing said output model to forecast future road maintenance costs and/or to plan and design future road networks, wherein
said EM algorithm is specially adapted to carry out the following steps:
1) standardize said data in sets;
2) when said data is standardized in sets, start with k 1;
3) set the initial value of μk to be the mean of the data set;
4) set the initial diagonal entries of Σk to be the variances of each variable;
5) set P(K)=1;
6) run clustering with the EM algorithm in this cluster;
7) obtain the new values for μk, Σk, (Pk) and the probability matrix P (k 1 xn);
8) define the BIC for this model as BICold=-(½)·Vold·log (N);
9) set k_prev=k; and
10) repeat the following steps until k_prev=k;
   a) set k_prev=k and a new variable called trace=1;
   b) repeat the following steps until trace=k_prev;
      (i) split the cluster at position trace into two clusters using PCA;
      (ii) select data points to perform PCA from the data points that are most likely to come from cluster trace by checking the values in the probability marix P (k 1 xn);
      (iii) run clustering with the EM algorithm for this new model;
      (iv) obtain μk's, Σk's and (Pk)'s and the probability matrix P (k 1 xn)'s, and for the new model;
      (v) define the BIC for this new model as BICnew=-λnew-(½)*Vnew*log(N);
      (vi) if λnew-λold>a·(½)·(N)·(vnew-Vold), then replace the old model with the new model obtained in step (iii);
      (vii) set K=+1;
      (viii) if λnew-λold is not >a·(½)·(N)·(vnew-Vold), then keep the original model;
      (ix) trace=trace+1; and
11) finally report the final model;
thereby determining and recognizing the types of vehicles passing the checkpoint to determine and recognize vehicle types in high volume traffic for monitoring traffic volumes of various types of vehicles, forecasting future road maintenance costs and planning and design of future road networks; wherein
in said steps:
N=number of data points;
V=number of variables;
K=number of clusters;
μk=the mean for kill cluster, each a vector of length V;
f° k:=the covariance matrices for kth cluster, each of size V*V;
xn.=the nth data point, which is a vector with length V;
P(k ! xn:)=the probability that xn comes from cluster k;
p(k)=: the probability that a data point chosen randomly comes from cluster k;
P(xn)=the probability of finding a data point at position xn;
$\lambda$=the value of log likelihood of the estimated parameter set;
PCA=Principal Component Analysis; and
BIC=Bayesian Information Criterion.

2. The method of claim 1, wherein said vehicle data comprises length of said vehicle, distance between axles of said vehicle, and weights on said axles of said vehicle.

3. The method of claim 1, including the additional step of obtaining the clustering results by checking the values in the final probability matrix.

4. The method of claim 1 including the additional step of using the final model, to cluster many data points where, if some data points are given, they can be assigned to their corresponding clusters, and obtaining a probability matrix whose entries are the values of P (k 1 $x_n$) for all values of cluster k's and $x_n$'s, and from these values determining which cluster that each data point most likely comes from by checking the values in the probability matrix.

5. The method of claim 1, for a vehicle that seldom appears, and it is desired to cluster it into a single cluster once it appears, by adding a new cluster to the final model, where the value of µ for the new cluster is the same as the variable values for this vehicle, where the covariance matrix Σ is a diagonal matrix, and setting diagonal entries of Σ to be very small numbers, where the variances for each variable are small numbers so that the values of P(k) for this cluster are set to be a small number since this vehicle is very rare to appear.

6. A method of determining and recognizing the types of vehicles passing a checkpoint which comprises the steps of:
uploading a computer program into a CPU, said computer program comprising an EM algorithm said EM algorithm including data representations of essential characteristics of vehicles
collecting vehicle data as said vehicles drive past a checkpoint to determine and recognize vehicle types for monitoring traffic volumes of various types of vehicles,
entering said data into said CPU; and
deriving an output from said CPU,
thereby monitoring traffic volumes of various types of vehicles for forecasting future road maintenance costs and planning and design of future road networks, wherein
the EM algorithm algorithm is specially adapted to carry out the following steps:
1) standardize said data in sets;
2) when said data is standardized in sets, start with k 1;
3) set the initial value of µk to be the mean of the data set;
4) set the initial diagonal entries of Σk to be the variances of each variable;
5) set P(K)=1;
6) run clustering with the EM algorithm in this cluster;
7) obtain the new values for µk, Σk, (Pk) and the probability matrix P (k 1 xn);
8) define the BIC for this model as BICold=–(½)·Vold·log(N);
9) set k_prev=.k; and
10) repeat the following steps until k_prev=k;
   a) set k_prev=k and a new variable called trace=1;
   b) repeat the following steps until trace=k_prev;
      (i) split the cluster at position trace into two clusters using PCA;
      (ii) select data points to perform PCA from the data points that are most likely to come from cluster trace by checking the values in the probability marix P (k 1 xn);
      (iii) run clustering with the EM algorithm for this new model;
      (iv) obtain µk's, Σk's and (Pk)'s and the probability matrix P (k 1 xn)'s, and for the new model;
      (v) define the BIC for this new model as BICnew=–λnew–(½)*Vnew*log(N);
      (vi) if λnew–λold>a·(½)·(N)·(vnew–Vold), then replace the old model with the new model obtained in step (iii);
      (vii) set K=+1;
      (viii) if λnew–λold is not >a·(½)·(N)·(vnew–Vold), then keep the original model;
      (ix) trace=trace+1; and
11) finally report the final model;
thereby determining and recognizing the types of vehicles passing the checkpoint to determine and recognize vehicle types in high volume traffic for monitoring traffic volumes of various types of vehicles, forecasting future road maintenance costs and planning and design of future road networks;
wherein
in said steps:
N=number of data points;
V=number of variables;
K=number of clusters;
µk=the mean for kill cluster, each a vector of length V;

f° k:=the covariance matrices for kth cluster, each of size V*V;
xn.=the nth data point, which is a vector with length V;
P(k ! xn:)=the probability that xn comes from cluster k;
p(k)=: the probability that a data point chosen randomly comes from cluster k;
P(xn)=the probability of finding a data point at position xn;
λ=the value of log likelihood of the estimated parameter set;
PCA=Principal Component Analysis; and
BIC=Bayesian Information Criterion.

7. An apparatus comprising the combination of:
a CPU; and
a computer program which has been uploaded into said CPU, said computer program comprising an EM algorithm, said EM algorithm including data representations of essential characteristics of vehicles, wherein
the EM algorithm is specially adapted to carry out the following steps:
1) standardize said data in sets;
2) when said data is standardized in sets, start with k 1;
3) set the initial value of µk to be the mean of the data set;
4) set the initial diagonal entries of Σk to be the variances of each variable;
5) set P(K)=1;
6) run clustering with the EM algorithm in this cluster;
7) obtain the new values for µk, Σk, (Pk) and the probability matrix P (k 1 xn);
8) define the BIC for this model as BICold=–(½)·Vold·log(N);
9) set k_prev=.k; and
10) repeat the following steps until k_prev=k;
   a) set k_prev=k and a new variable called trace=1;
   b) repeat the following steps until trace=k_prev;
      (i) split the cluster at position trace into two clusters using PCA;
      (ii) select data points to perform PCA from the data points that are most likely to come from cluster trace by checking the values in the probability marix P (k 1 xn);
      (iii) run clustering with the EM algorithm for this new model;
      (iv) obtain µk's, Σk's and (Pk)'s and the probability matrix P (k 1 xn)'s, and for the new model;
      (v) define the BIC for this new model as BICnew=–λnew–(½)*Vnew*log(N);
      (vi) if λnew–λold>a·(½)·(N)·(vnew–Vold), then replace the old model with the new model obtained in step (iii);
      (vii) set K=+1;
      (viii) if λnew–λold is not >a·(½)·(N)·(vnew–Vold), then keep the original model;
      (ix) trace=trace+1; and
11) finally report the final model;
thereby determining and recognizing the types of vehicles passing the checkpoint to determine and recognize vehicle types in high volume traffic for monitoring traffic volumes of various types of vehicles, forecasting future road maintenance costs and planning and design of future road networks; wherein
in said steps:
N=number of data points;
V=number of variables;
K=number of clusters;
µk=the mean for kill cluster, each a vector of length V;

f°k:=the covariance matrices for kth cluster, each of size V*V;
xn=the nth data point, which is a vector with length V;
P(k ! xn:)=the probability that xn comes from cluster k;
p(k)=: the probability that a data point chosen randomly comes from cluster k;
P(xn)=the probability of finding a data point at position xn;
λ=the value of log likelihood of the estimated parameter set;
PCA=Principal Component Analysis; and
BIC=Bayesian Information Criterion.

8. The apparatus of claim 7 wherein said vehicle data comprises length of said vehicle, distance between axles of said vehicle and weights on said axles of said vehicle.

9. An apparatus for determining and recognizing types of vehicles passing a check point, which comprises:
a CPU;
an EM algorithm uploaded into said CPU;
structure operatively associated with said CPU for collecting vehicle data as vehicles drive past said check point;
means, operatively associated with said CPU for entering said data into said CPU said data being representative of essential characteristics of vehicles;
means for processing said data by said EM algorithm to produce an output model of the traffic volumes of the various types of vehicles; and
means for utilizing said output model to forecast future road maintenance costs and/or to plan and design future road networks, wherein
the EM algorithm is specially adapted to carry out the following steps:
1) standardize said data in sets;
2) when said data is standardized in sets, start with k 1;
3) set the initial value of μk to be the mean of the data set;
4) set the initial diagonal entries of Σk to be the variances of each variable;
5) set P(K)=1;
6) run clustering with the EM algorithm in this cluster;
7) obtain the new values for μk, Σk, (Pk) and the probability matrix P (k 1 xn);
8) define the BIC for this model as BICold=−(½)·Vold·log(N);
9) set k_prev=k; and
10) repeat the following steps until k_prev=k;
  a) set k_prev=k and a new variable called trace=1;
  b) repeat the following steps until trace=k_prev;
    (i) split the cluster at position trace into two clusters using PCA;
    (ii) select data points to perform PCA from the data points that are most likely to come from cluster trace by checking the values in the probability marix P (k 1 xn);
    (iii) run clustering with the EM algorithm for this new model;
    (iv) obtain μk's, Σk's and (Pk)'s and the probability matrix P (k 1 xn)'s, and for the new model;
    (v) define the BIC for this new model as BICnew=−λnew−(½)·Vnew·log(N);
    (vi) if λnew−λold>a·(½)·(N)·(vnew−Vold), then replace the old model with the new model obtained in step (iii);
    (vii) set K=+1;
    (viii) if λnew−λold is not >a·(½)·(N)·(vnew−Vold), then keep the original model;
    (ix) trace trace+1; and
11) finally report the final model;
thereby determining and recognizing the types of vehicles passing the checkpoint to determine and recognize vehicle types in high volume traffic for monitoring traffic volumes of various types of vehicles, forecasting future road maintenance costs and planning and design of future road networks; wherein
in said steps:
N=number of data points;
V=number of variables;
K=number of clusters;
μk=the mean for kill cluster, each a vector of length V;
f°k:=the covariance matrices for kth cluster, each of size V*V;
xn=the nth data point, which is a vector with length V;
P(k ! xn:)=the probability that xn comes from cluster k;
p(k)=: the probability that a data point chosen randomly comes from cluster k;
P(xn)=the probability of finding a data point at position xn;
λ=the value of log likelihood of the estimated parameter set;
PCA=Principal Component Analysis; and
BIC=Bayesian Information Criterion.

* * * * *